United States Patent
Fontolan et al.

(10) Patent No.: US 8,974,149 B2
(45) Date of Patent: Mar. 10, 2015

(54) METHOD OF JOINING TWO PORTIONS OF AN UNDERWATER PIPELINE FOR CONDUCTING FLUIDS AND/OR GAS

(75) Inventors: Massimo Fontolan, Zero Branco (IT); Roberto Brandi, Padua (IT); Luca Michelazzo, Mestrino (IT); Bruno Rosa, Villarbasse (IT)

(73) Assignee: SAIPEM S.p.A., San Donato Milanese (IT)

( * ) Notice: Subject to any disclaimer, the term of this patent is extended or adjusted under 35 U.S.C. 154(b) by 0 days.

(21) Appl. No.: 13/319,950

(22) PCT Filed: May 11, 2010

(86) PCT No.: PCT/IB2010/001076
§ 371 (c)(1),
(2), (4) Date: Apr. 19, 2012

(87) PCT Pub. No.: WO2011/001231
PCT Pub. Date: Jan. 6, 2011

(65) Prior Publication Data
US 2012/0269582 A1 Oct. 25, 2012

(30) Foreign Application Priority Data
May 11, 2009 (IT) .............. MI2009A0803

(51) Int. Cl.
*F16L 1/26* (2006.01)
*F16L 1/16* (2006.01)
*F16L 55/16* (2006.01)

(52) U.S. Cl.
CPC . *F16L 1/26* (2013.01); *F16L 1/166* (2013.01); *F16L 55/1608* (2013.01)
USPC ............ 405/170; 405/173; 405/169; 285/302

(58) Field of Classification Search
CPC .......... F16L 1/26; F16L 1/166; F16L 55/1608
USPC ........... 405/154.1, 158, 167, 170, 173, 184.1, 405/156, 184.4; 285/302, 298, 145.1
See application file for complete search history.

(56) References Cited

U.S. PATENT DOCUMENTS 1,869,778 A * 8/1932 Roberts .......................... 269/37
3,578,233 A * 5/1971 Meister et al. ................. 228/5.1

(Continued)

FOREIGN PATENT DOCUMENTS

| EP | 0 031 611 | 7/1981 |
| GB | 2 125 138 A | 2/1984 |

OTHER PUBLICATIONS

International Search Report and Written Opinion for International Appl. No. PCT/IB2010/001076, European Patent Office, The Netherlands, mailed on Jan. 21, 2011, 11 pages.

(Continued)

*Primary Examiner* — Thomas B Will
*Assistant Examiner* — Jessica H Lutz
(74) *Attorney, Agent, or Firm* — Sterne, Kessler, Goldstein & Fox P.L.L.C.

(57) ABSTRACT

A method of joining two portions of an underwater pipeline for conducting fluid and/or gas on the bed of a body of water, the method including the steps of: joining a telescopic sleeve, having a first coupling head, to a first end of a first pipeline portion above the body of water; positioning the first end, the telescopic sleeve, and the first coupling head in a first given position on the bed of the body of water; joining a second coupling head to a second end of a second pipeline portion above the body of water; positioning the second end and the second coupling head in a second given position, close to the first coupling head, below the body of water; and connecting the first and second coupling head hermetically below the body of water.

18 Claims, 19 Drawing Sheets

(56) References Cited

U.S. PATENT DOCUMENTS

| | | | |
|---|---|---|---|
| 3,645,563 A | | 2/1972 | Rochelle |
| 3,751,932 A | * | 8/1973 | Matthews, Jr. ............... 405/173 |
| 3,780,421 A | * | 12/1973 | White et al. .................... 29/466 |
| 4,051,687 A | * | 10/1977 | Ells ............................... 405/173 |
| 4,076,130 A | | 2/1978 | Sumner ......................... 405/170 |
| 4,218,158 A | * | 8/1980 | Tesson .......................... 405/170 |
| 4,302,652 A | * | 11/1981 | Nobileau et al. ................ 219/72 |
| 4,304,505 A | * | 12/1981 | Silvestri et al. ............... 405/170 |
| 4,335,752 A | * | 6/1982 | Sumner .......................... 138/97 |
| 4,444,527 A | * | 4/1984 | Fournie et al. ................ 405/170 |
| 4,445,804 A | * | 5/1984 | Abdallah et al. ............. 405/173 |
| 4,493,590 A | * | 1/1985 | Ayers et al. ................... 405/170 |
| 4,687,232 A | * | 8/1987 | Zimmerman ................... 285/31 |
| 4,805,444 A | * | 2/1989 | Webb ......................... 73/40.5 R |
| 5,297,896 A | * | 3/1994 | Webb .............................. 405/52 |
| 5,425,599 A | * | 6/1995 | Hall et al. ..................... 405/158 |
| 5,433,482 A | * | 7/1995 | Baddour ......................... 285/31 |
| 5,437,517 A | * | 8/1995 | Carrioli et al. ................ 405/169 |
| 6,227,765 B1 | * | 5/2001 | von Trepka ................... 405/170 |
| 6,503,021 B2 | * | 1/2003 | Corbetta ....................... 405/170 |
| 2007/0269270 A1 | * | 11/2007 | Bastesen et al. ............. 405/170 |
| 2008/0252068 A1 | * | 10/2008 | Quinn ............................ 285/18 |

OTHER PUBLICATIONS

Copending U.S. Appl. No. 13/319,956, 371(c) Date: Jan. 30, 2012.

* cited by examiner

METHOD OF JOINING TWO PORTIONS OF AN UNDERWATER PIPELINE FOR CONDUCTING FLUIDS AND/OR GAS

TECHNICAL FIELD

The present invention relates to a method of joining two portions of an underwater pipeline for conducting fluid and/or gas on the bed of a body of water.

BACKGROUND ART

For the purpose of the present invention, the term "underwater pipeline" is generally intended to mean a pipeline laid on the bed of a body of even deep water to conduct gas and/or fluid, in particular oil.

An underwater pipeline of the type described covers distances of hundreds of kilometers, is composed of pipes joined to one another on a laying vessel, is launched into the water off the laying vessel, and is laid on the bed of the body of water as it is assembled.

Each pipe is normally of 12-meter unit length, has a relatively large diameter ranging between 0.2 and 1.5 meters, and comprises a steel cylinder; a protective covering of polymer material contacting the steel cylinder to protect it from corrosion; and sometimes a heavy covering of concrete or Gunite contacting the protective covering to weigh the pipe down.

The pipes are joined at on-land installations into pipes of multiple unit length, and on laying vessels on which the pipes of unit or multiple unit length are joined to form the pipeline, which is then launched off the laying vessel onto the bed of the body of water.

The pipeline is assembled and launched off the laying vessel using one of two methods, depending on the depth of the body of water.

In a first method, the pipeline is formed on a launch tower comprising an assembly station, and is launched substantially vertically so that it assumes a J-shaped configuration between the laying vessel and the bed of the body of water. This method is particularly suitable for laying pipelines in very deep water.

In the second method, the pipeline is formed on a substantially horizontal assembly line, and is launched off a lay ramp which, in the work configuration, serves to guide and support the pipeline along a curved path having a first portion above water, and a second portion below water. Pipelines laid using this method assume an S-shaped configuration between the laying vessel and the bed of the body of water.

Close to coastlines and in shallow water, pipelines are normally buried in the bed to protect them against hydrodynamic stress, changes in temperature, and damage by foreign bodies.

Burying underwater pipelines in the bed is a common practice in shallow water, but is difficult to do and economically unfeasible in deep water. As a result, pipelines simply laid on the bed in deep water are exposed to blunt objects, such as inadvertently towed anchors, which literally "plough" the bed and may damage the pipeline, even to the point of ripping it apart. Incidents of this sort are relatively rare, but the damage caused by them is enormous, both in terms of pollution and the fact that many countries depend almost entirely on such pipelines for their energy supply.

When they do occur, therefore, steps must be taken immediately to repair, seal, and restore the mechanical characteristics of the pipeline.

Various methods of doing this have been proposed, some of which provide for carrying out all the repair work in the body of water, and others for performing part of the repair work above the body of water, and part in the body of water.

A repair method described in U.S. Pat. No. 5,437,517 comprises the steps of cutting out the damaged length of pipeline to form a first and second pipeline portion having a first and second end respectively; joining a first coupling head to the first pipeline portion in the body of water; joining a second coupling head to the second pipeline portion in the body of water; laying a telescopic sleeve, having a third and fourth coupling head, in the body of water, between the first and second coupling head; aligning the first pipeline portion, the second pipeline portion, and the telescopic sleeve in the body of water; adjusting the length of the telescopic sleeve in the body of water; and joining the telescopic sleeve to the first and second coupling head in the body of water. The telescopic sleeve, which comprises two sliding tubes, is then locked into position. All the above operations are performed in the body of water using underwater equipment controlled by ROVs (Remote Operated Vehicles) connected by cable (umbilical) to a laying vessel.

One of the most critical parts of the above method is aligning the first and second pipeline portion and the telescopic sleeve; and the deeper the water is, the more difficult alignment becomes. Adjusting the length of the telescopic sleeve is also a delicate operation, by having to be performed without moving the sleeve out of line with respect to the first and second coupling head.

An underwater pipeline repair method described in U.S. Pat. No. 4,304,505 comprises the steps of cutting out the damaged length of pipeline to form a first and second pipeline portion having a first and second end respectively; raising the first end onto a laying vessel; joining a first coupling head to the first pipeline portion; laying the first end and the first coupling head onto the bed of the body of water; raising the second end onto the laying vessel; joining a second coupling head to the second pipeline portion; laying the second end and the second coupling head onto the bed; laying a pipe section, having a third and fourth coupling head, in the body of water, between the first and second coupling head; aligning the first pipeline portion, the second pipeline portion, and the pipe section in the body of water; and joining the pipe section to the first and second coupling head in the body of water.

This method too involves a critical aligning stage, which is vital for achieving connections capable of restoring the mechanical characteristics and fluidtight sealing between the pipe section and the first and second pipeline portion.

Accurately aligning the first and second pipeline portion and the telescopic sleeve or pipe section calls for the use of an extremely complex aligning device designed to engage and align the first and second pipeline portion and the telescopic sleeve (or pipe section, in the case of the method described in U.S. Pat. No. 4,304,505).

DISCLOSURE OF INVENTION

It is an object of the present invention to provide a straightforward method of joining two portions of an underwater pipeline, with no need for complex, bulky equipment.

Another object of the present invention is to provide a method of joining two portions of an underwater pipeline that can be implemented on sloping and/or uneven beds.

According to the present invention, there is provided a method of joining two portions of an underwater pipeline for conducting fluid and/or gas on the bed of a body of water; the method comprising the steps of:

joining a telescopic sleeve, having a first coupling head; to a first end of a first pipeline portion above the body of water;

positioning the first end, the telescopic sleeve, and the first coupling head in a first given position below the body of water;

joining a second coupling head to a second end of a second pipeline portion above the body of water;

positioning the second end and the second coupling head in a second given position, close to the first coupling head, below the body of water; and connecting the first and second coupling head hermetically below the body of water.

The present invention makes the aligning step relatively easy, by only having to align the first and second coupling head in the body of water; all the other connections being made abovewater.

Another object of the present invention is to provide a method of repairing an underwater pipeline.

According to the present invention, there is provided a method of repairing an underwater pipeline, the method comprising the steps of cutting and removing a pipeline section from the pipeline below a body of water to form a first and second pipeline portion; raising the first and second pipeline portion partly above the body of water; and joining the first and second pipeline portion using the method described above for joining two portions of an underwater pipeline.

Another object of the present invention is to provide a method of laying an underwater pipeline.

According to the present invention, there is provided a method of laying an underwater pipeline, the method comprising the steps of laying a first and second pipeline portion along two respective converging paths by means of two respective laying vessels; and joining the first and second pipeline portion using the method described above for joining two portions of an underwater pipeline.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
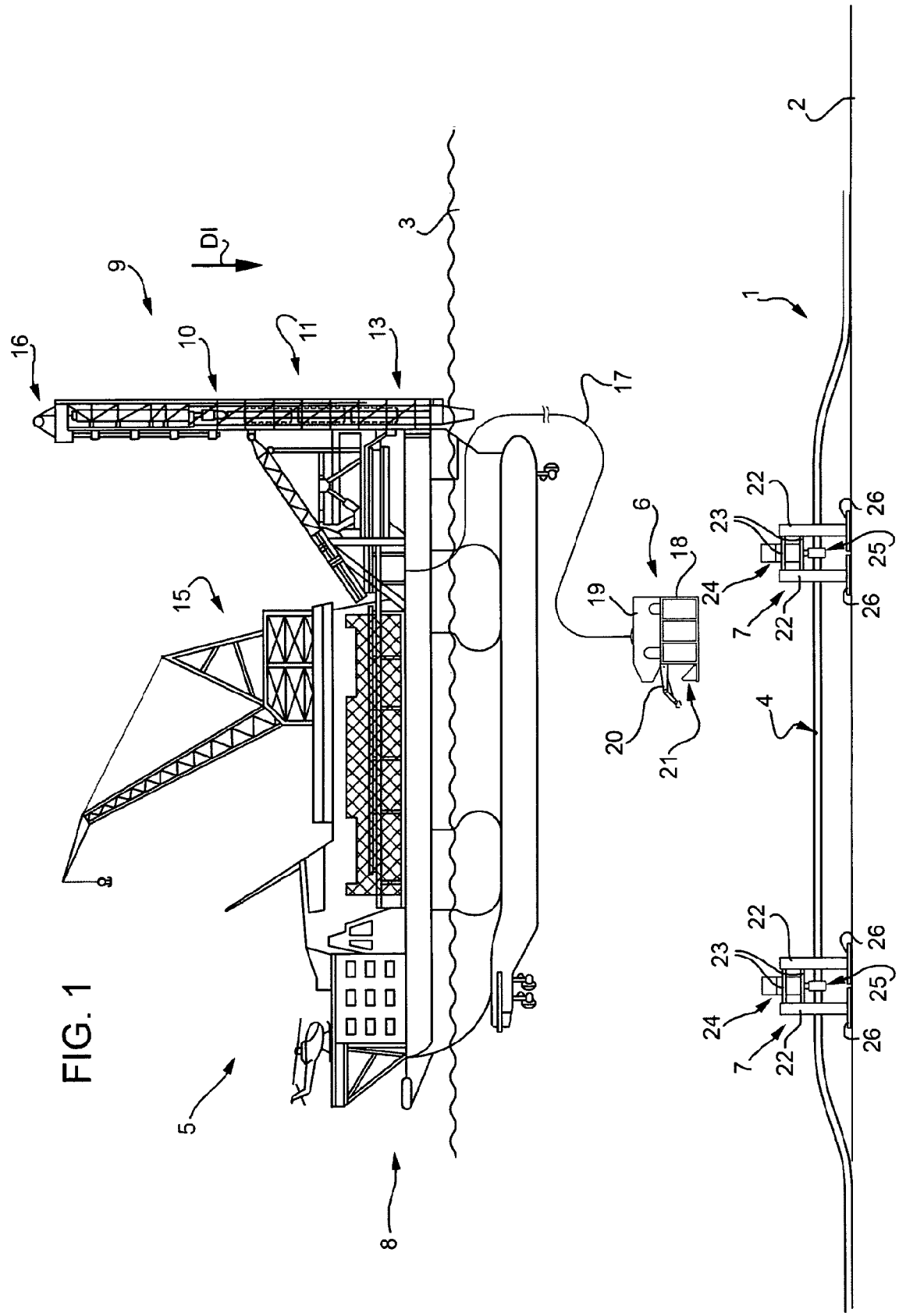
FIGS. 1 to 5 show side views, with parts removed for clarity, of an underwater pipeline lying in a body of water and at various stages in the underwater pipeline repair method according to the present invention.

Number 1 in FIG. 1 indicates as a whole an underwater pipeline laid on the bed 2 of a body of water 3 to conduct fluid and/or gas, and in particular oil.

Pipeline 1 has a damaged area—in the example shown, a rip 4 caused accidentally—and is in need of repair. For the sake of simplicity in the description and drawings, bed 2 is flat, though pipeline 1 may lie on sloping or variously uneven beds.

FIG. 1 also partly shows the pipeline repair equipment employed, which comprises a laying vessel 5; underwater remote operated vehicles (ROVs) 6, only one of which is shown in FIG. 1; and two gantry cranes 7 which rest on bed 2 of the body of water 3 to raise and support the part of pipeline 1 containing rip 4 off bed 2.

As shown in FIG. 1, gantry cranes 7 are positioned astride pipeline 1 and on either side of rip 4 to lift the part of pipeline 1 containing rip 4 off bed 2.

The Laying Vessel

Laying vessel 5 is designed to assemble pipelines on board and launch pipelines into the body of water 3. In this particular case, laying vessel 5 is used to repair pipeline 1 lying on the bed of body of water 3.

Laying vessel 5 comprises a semisubmersible 8; and a launch rig 9 which, in the example shown, is a launch tower which extends in a substantially vertical launch direction D1, is hinged to semisubmersible 8, and is designed to J-launch the pipeline onto bed 2 of body of water 3. Though shown in a substantially vertical position, launch rig 9 can be tilted to an angle of 30° with respect to the vertical at the launch stage.

Launch rig 9 is substantially defined by an elongated trestle structure, and comprises a top portion housing an assembly station 10; an intermediate portion housing a gripping fixture 11 comprising a crawler gripping device 12 (FIG. 6) for selectively gripping pipeline 1; and a bottom portion housing a step feed device 13 comprising jaws 14 fixed to the trestle structure (FIG. 6), and movable jaws (not shown) movable along the trestle structure.

Laying vessel 5 is equipped with at least one crane 15 for lowering into the water and recovering underwater vehicle 6, gantry cranes 7, and other equipment used to repair pipeline 1; and a winch 16 fitted to launch rig 9 to recover and hoist parts of pipeline 1 off bed 2 of body of water 3 and partly into launch rig 9, at assembly station 10, and to lower them into body of water 3.

The Underwater Vehicle

Underwater vehicle 6 is controlled from laying vessel 5 over an umbilical 17, and comprises a frame 18; a pontoon 19; television cameras (not shown); a propeller assembly (not shown); at least one manipulator arm 20; and a docking station 21 which docks with respective docking stations of underwater equipment for carrying out operations as described below.

Depending on the operations performed in body of water 3, one or more underwater vehicles 6 may be used to speed up repair of pipeline 1.

The Gantry Crane

Each gantry crane 7 comprises two gantry structures 22 connected rigidly by cross beams 23; a powered carriage assembly 24 connected to two jaws 25 for gripping pipeline 1, and which moves jaws 25 along a system of cartesian axes xyz inside gantry structures 22; and a docking station (not shown) which docks with docking station 21 of underwater vehicle 6, which thereby controls operation of powered carriage assembly 24 and jaws 25.

Each gantry structure 22 is equipped with supporting plates 26 which are embedded in bed 2 to define a precise position of gantry crane 7.

The Underwater Pipeline

Figure 7:
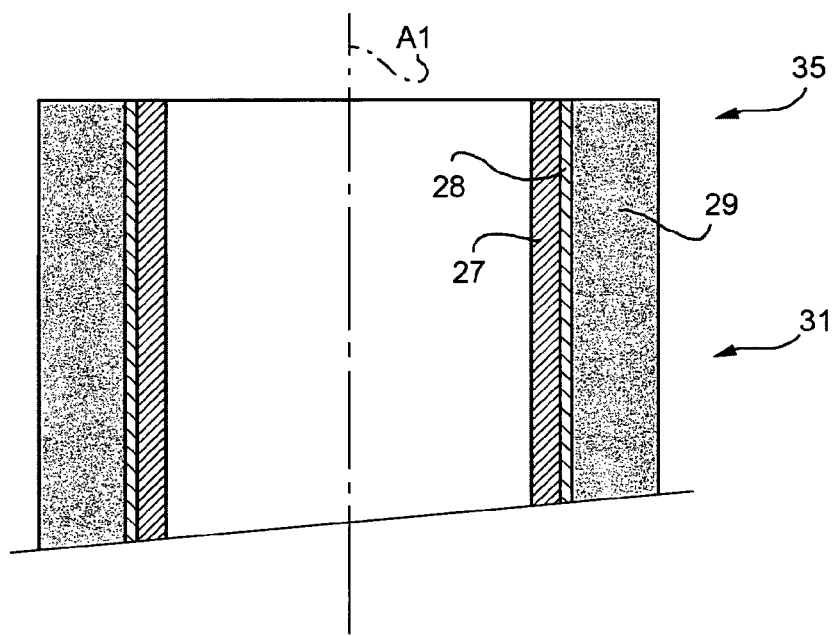
FIGS. 7 to 9 show larger-scale, longitudinal sections, with parts removed for clarity, of one end of a pipeline portion at respective stages in the method of joining two portions of an underwater pipeline according to the present invention.

With reference to FIG. 7, pipeline 1 comprises a metal cylinder 27, and a protective covering 28 of deformable polymer material about metal cylinder 27. In other words, protective covering 28 is more deformable than metal cylinder 27.

The term "protective covering" includes relatively thin (a few millimeters thick) PP (polypropylene) or PE (polyethylene) corrosion-proofing coverings, as well as lagging which, in addition to corrosion-proofing, also provides for thermal insulation, may be as much as a few tens of a mm in thickness, and is normally made of solid PU (polyurethane) or multi-layer PP (polypropylene).

Pipeline 1 also has a concrete or Gunite covering on top of protective covering 28 to weigh the pipeline down.

With reference to FIG. 1, rip 4 has compromised the integrity of metal cylinder 27 (FIG. 7), resulting in oil leakage into body of water 3 and water flow into pipeline 1. The method according to the present invention provides for repairing pipeline 1 to restore the mechanical characteristics and fluidtight sealing of the pipeline as laid down by current safety standards.

Pipeline 1 is flexible enough to extend along curved paths.

Pipeline Repair Method Including the Method of Joining Two Portions of an Underwater Pipeline The repair method comprises moving laying vessel 5 and the other repair equipment to the accident site, and lowering underwater vehicle 6 and gantry cranes 7 into the water using crane 15. Correct positioning of gantry cranes 7 on either side of rip 4 and astride pipeline 1 is controlled by underwater vehicle 6, which is connected to each gantry crane 7 by docking station 21, and remains connected to gantry crane 7 to control gripping and raising of pipeline 1 by means of jaws 25.

The above operations are performed for each gantry crane 7.

In an embodiment not shown, gantry cranes 7 may be more than two in number, the number substantially depending on the type of pipeline 1, the type of gantry crane 7, and the type of bed 2.

Similarly, more than one underwater vehicle 6 may be employed. In a preferred operating mode, two underwater vehicles 6 are employed to operate at least two gantry cranes 7 simultaneously.

When raised by both gantry cranes 7, pipeline 1 assumes the configuration shown in FIG. 1.

Figure 2:
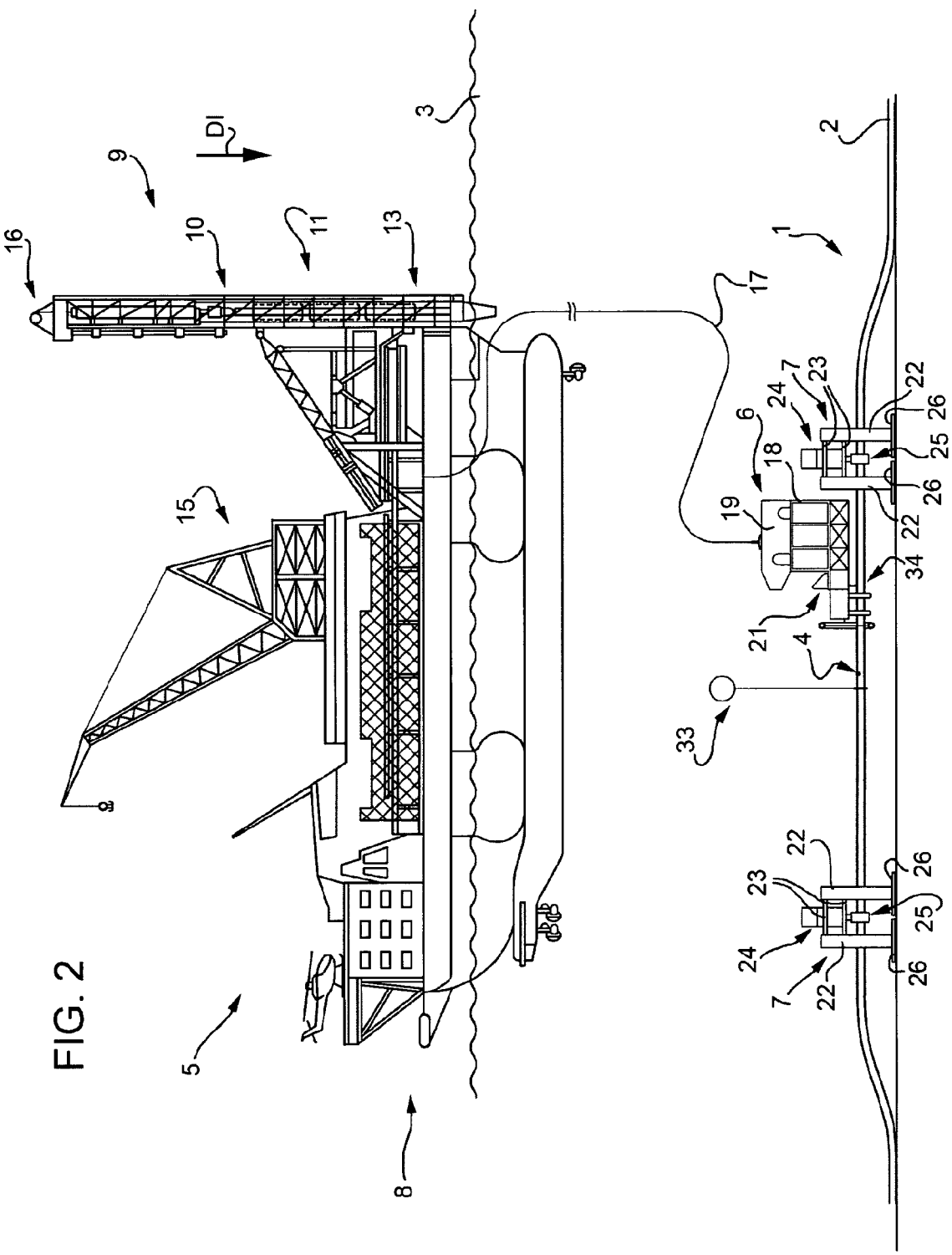
Figure 3:
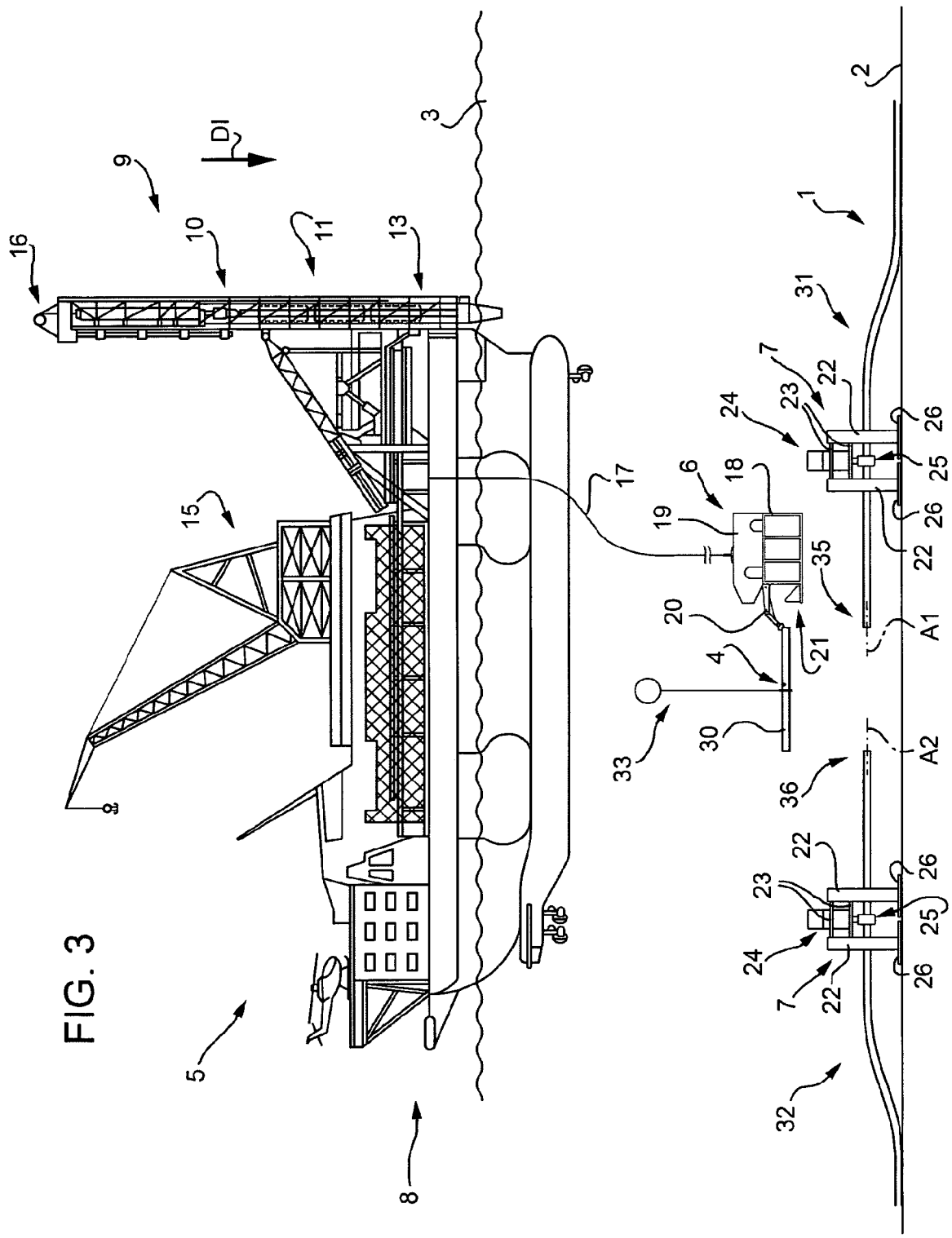

FIG. 2 shows the step of cutting pipeline 1, which comprises making two cuts crosswise to pipeline 1 on opposite sides of rip 4, so as to divide pipeline 1 into a portion 30 containing the damaged area, i.e. rip 4, and two pipeline portions 31 and 32, as shown in FIG. 3.

With reference to FIG. 2, the portion of pipeline 1 eventually defining portion 30 is connected to a float 33, and underwater vehicle 6 is connected to a cutter 34 which, in the preferred embodiment, is defined by a wire cutter with which to make the cuts in pipeline 1 as described above.

With reference to FIG. 3, portion 30 is lifted onto laying vessel 5 by means of float 33, underwater vehicle 6, and crane 15.

The two portions 31 and 32 of the pipeline thus have respective ends 35 and 36, and extend along respective axes A1 and A2.

The length of the recovered portion 30 is measured to determine the distance between ends 35 and 36.

Figure 4:
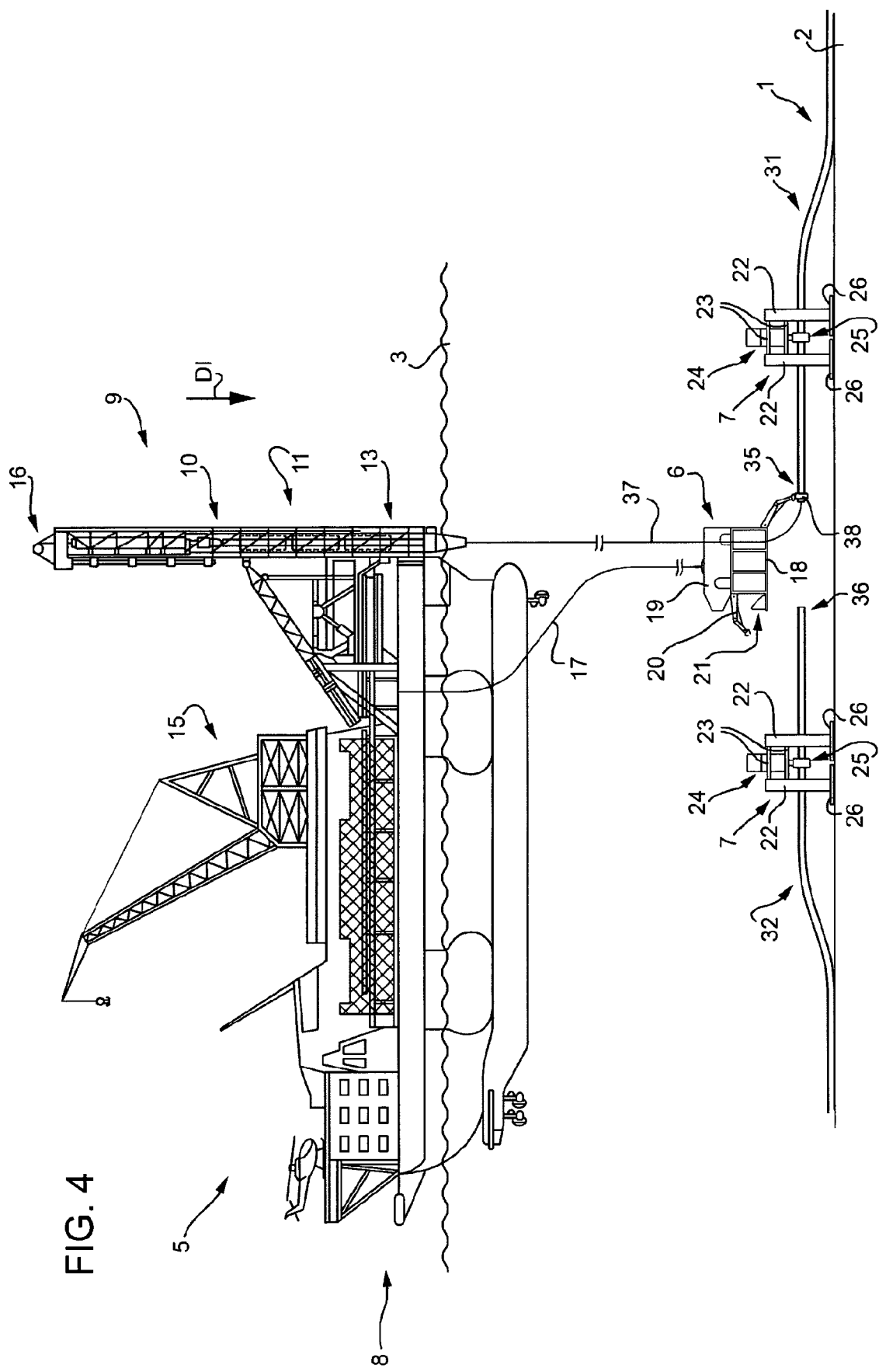

With reference to FIG. 4, winch 16 lowers a cable 37 connected to a gripping head 38 which, in the example shown, is an expansion head which is inserted into end 35 of pipeline portion 31 and subsequently expanded to grip end 35 of pipeline portion 31 from the inside.

Insertion and expansion of gripping head 38 inside end 35 are controlled by underwater vehicle 6.

Figure 5:
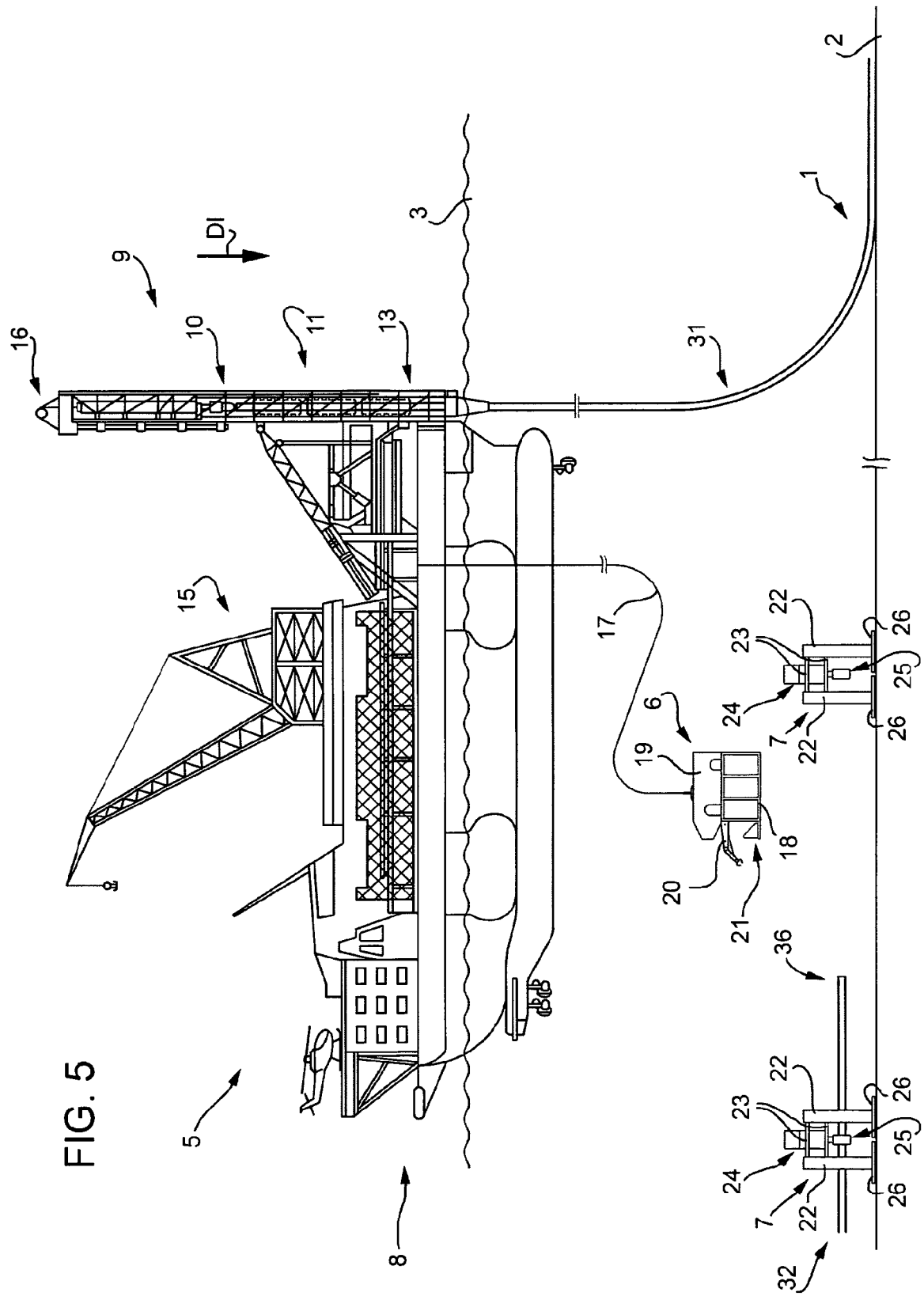
Figure 6:
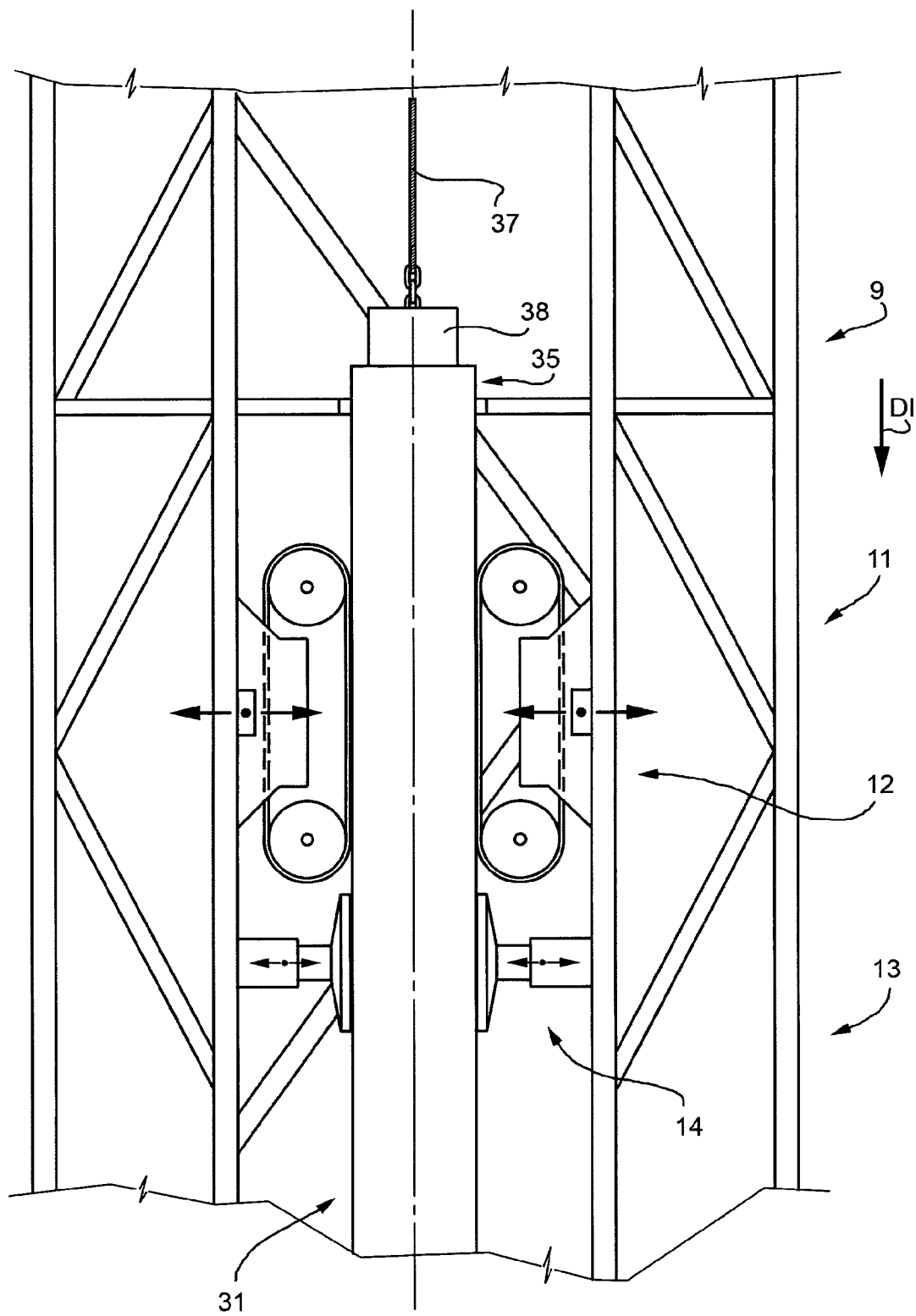
FIG. 6 shows a larger-scale, partly sectioned side view, with parts removed for clarity, of a detail of a launching device employed in the method of joining two portions of an underwater pipeline according to the present invention.
Figure 8:
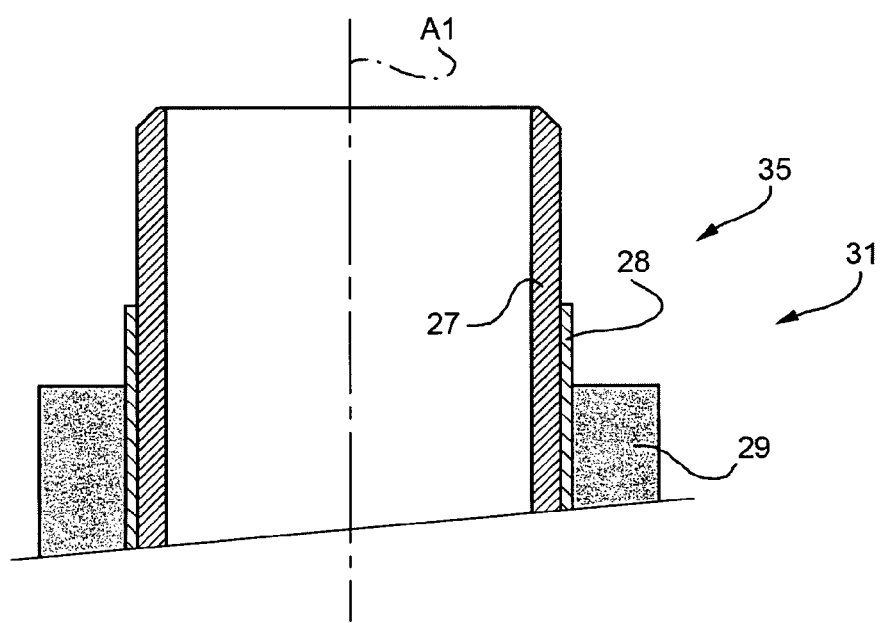

With reference to FIG. 5, pipeline portion 31 is raised partly by winch 16 and gripping head 38, and inserted partly inside launch rig 9, as shown in FIG. 6. Inside launch rig 9, crawler gripping devices 12 and jaws 14 grip pipeline portion 31, and gripping head 38 is released from end 35 of pipeline portion 31. End 35 is raised as far as assembly station 10, where weigh-down covering 29 and protective covering 28 are removed from end 35, and end 35 is bevelled to form a suitable edge on metal cylinder 27. More specifically, in the example shown, the work carried out on end 35 at assembly station 10, above body of water 3, transforms end 35 from the FIG. 7 to the FIG. 8 configuration.

Removal of protective covering 28 may also include grit blasting the exposed part of metal cylinder 27.

Figure 9:
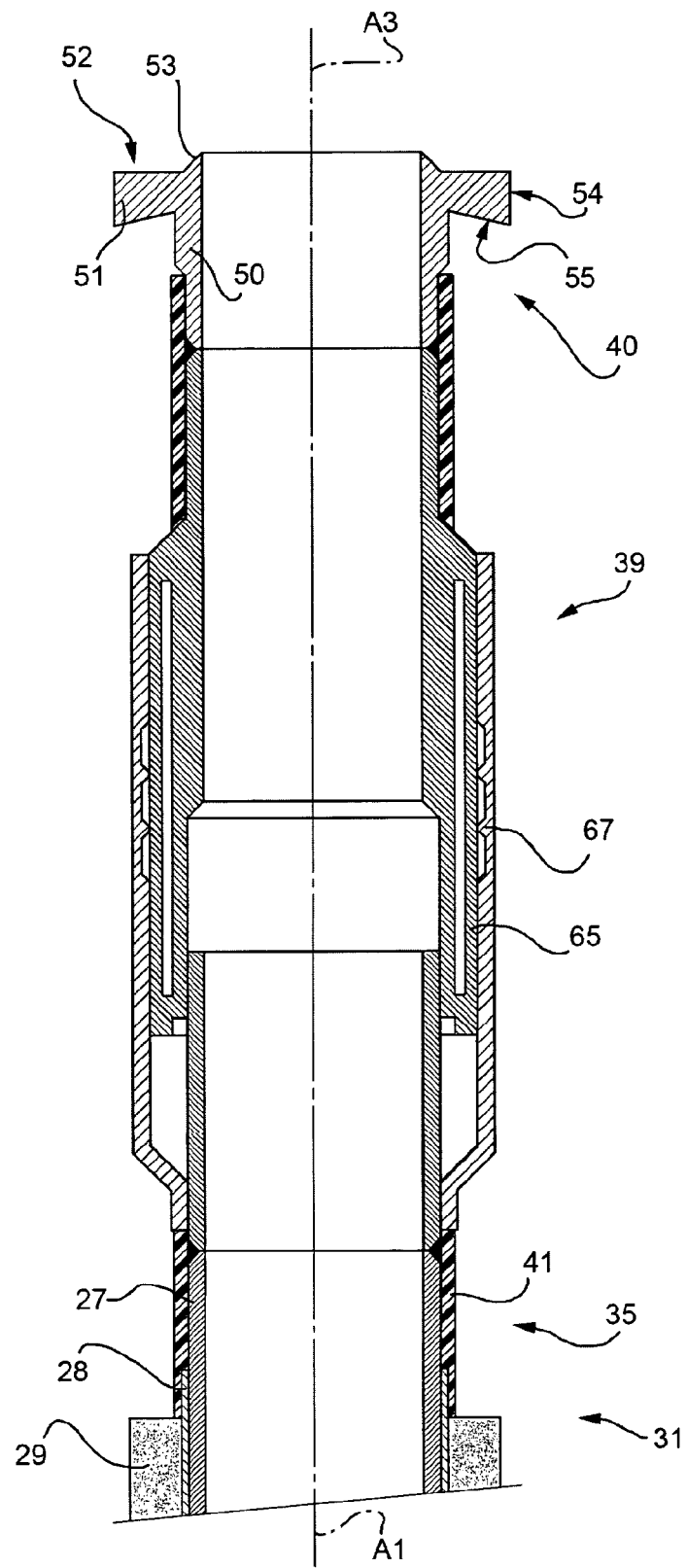

A telescopic sleeve 39 with a coupling head 40 is then joined to pipeline portion 31 at assembly station 10, above body of water 3. More specifically, telescopic sleeve 39 has an axis A3 and is welded to metal cylinder 27, with axes A1 and A3 aligned, to form the structure shown in FIG. 9.

The weld area may subsequently be covered with a protective joint 41 at assembly station 10.

Pipeline portion 31, telescopic sleeve 39, and coupling head 40 are then laid on bed 2 of body of water 3 by winch 16 and gripping head 38. Alternatively, winch 16 may be connected directly to telescopic sleeve 39.

Figure 10:
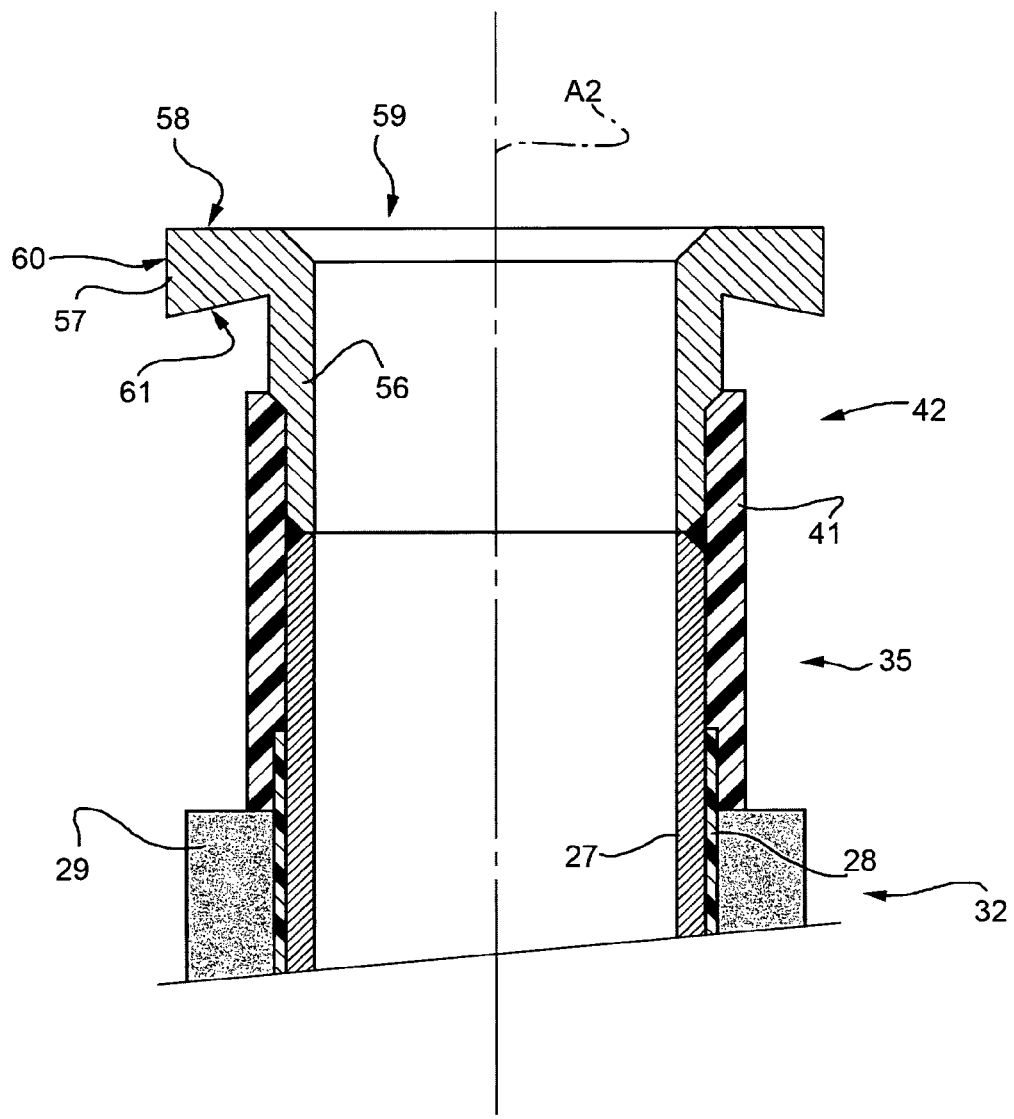
FIG. 10 shows a larger-scale, longitudinal section, with parts removed for clarity, of one end of a further pipeline portion at one stage in the method of joining two portions of an underwater pipeline according to the present invention.

In the same way as for pipeline portion 31, pipeline portion 32 is inserted partly inside launch rig 9, coverings 28 and 29 are removed, the edge of metal cylinder 27 is bevelled, portion 32 is joined to a coupling head 42, and the joint is covered with a protective covering 41, as shown in FIG. 10.

Figure 11:
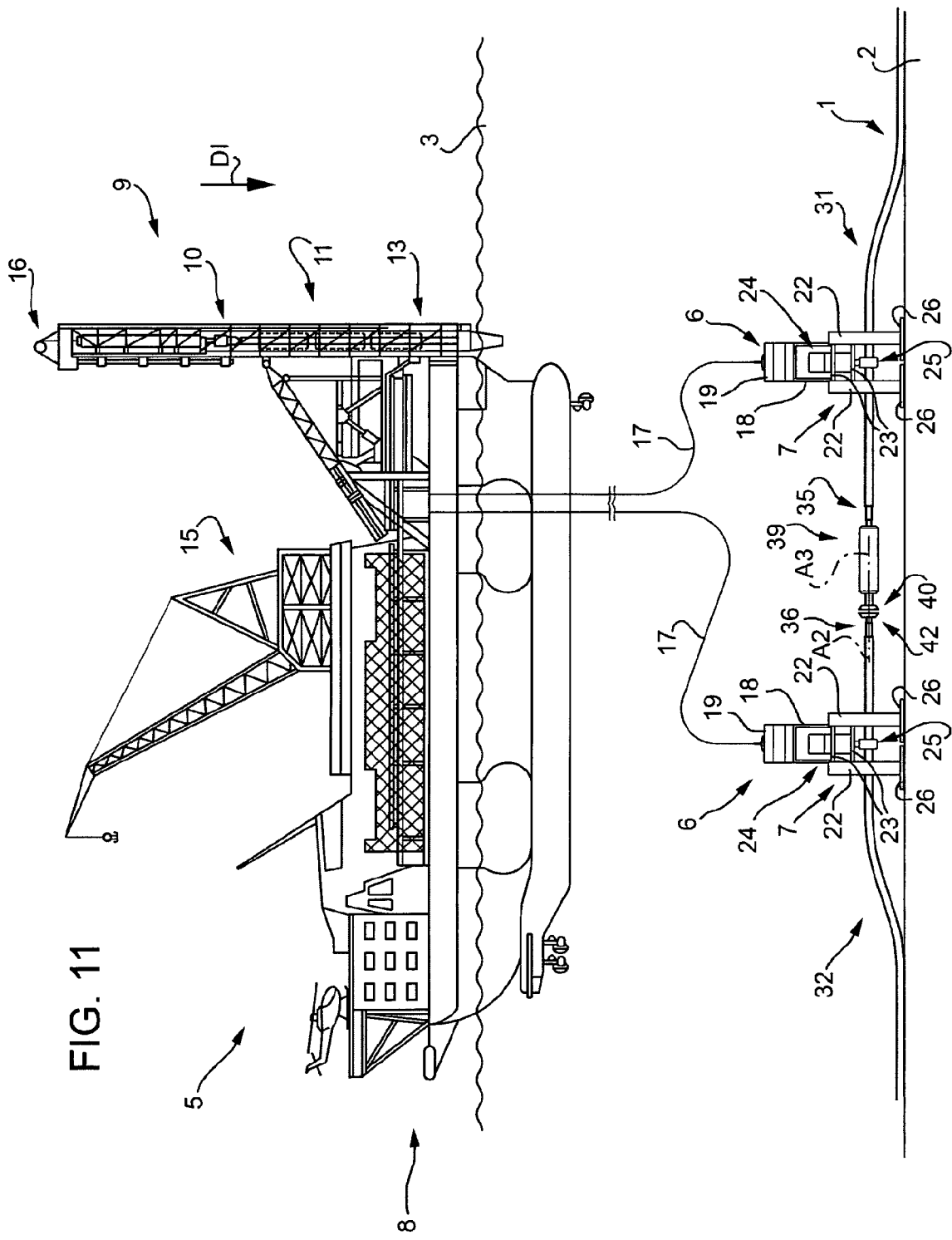
FIGS. 11 and 12 show side views, with parts removed for clarity, of an underwater pipeline lying in a body of water and at different stages in the method of joining two portions of an underwater pipeline according to the present invention.

Once these operations are completed, underwater vehicle 6 lays pipeline portion 32 on bed 2 of body of water 3, so that coupling head 42 is positioned close to and facing coupling head 40. Gantry cranes 7 are positioned along respective pipeline portions 31, 32 as shown in FIG. 11, and respective jaws 25 grip respective ends 35, 36 of portions 31, 32 to produce the configuration shown in FIG. 11.

At this stage, the two gantry cranes 7 are preferably controlled simultaneously by respective underwater vehicles 6 to align coupling heads 40 and 42 faster. To align them, each coupling head 40, 42 is equipped with a signal transmitter which indicates the position of the respective coupling head and transmits it to the respective underwater vehicle 6 controlling respective gantry crane 7; and gantry cranes 7 move the ends of pipeline portions 31 and 32 and coupling heads 40 and 42 to align axes A3 and A2 roughly, with a margin of error of a few millimeters.

Before being welded to end 35 of pipeline portion 31, telescopic sleeve 39 is adjusted in length on board laying vessel 5, above body of water 3. This rough adjustment is based on the distance determined between ends 35 and 36, and the length of coupling heads 40 and 42. Theoretically, the length of telescopic sleeve 39 and the lengths of coupling heads 40 and 42 should total the length of portion 30 removed from pipeline 1. For easy manoeuvring, however, the length of telescopic sleeve 39 is preferably adjusted to leave a gap of a few decimeters between coupling heads 40 and 42 when they are aligned in body of water 3.

When aligned roughly by gantry cranes 7, coupling heads 40 and 42 are separated a few decimeters apart, and axes A2 and A3 are also most likely offset a few millimeters.

Coupling heads 40 and 42 are connected hermetically by a clamping device 43 which, together with coupling heads 40, 42, forms part of a self-centring connecting assembly 44 which, at the clamping stage, aligns axes A3 and A2 and extends telescopic sleeve 39 simultaneously.

Figure 14:
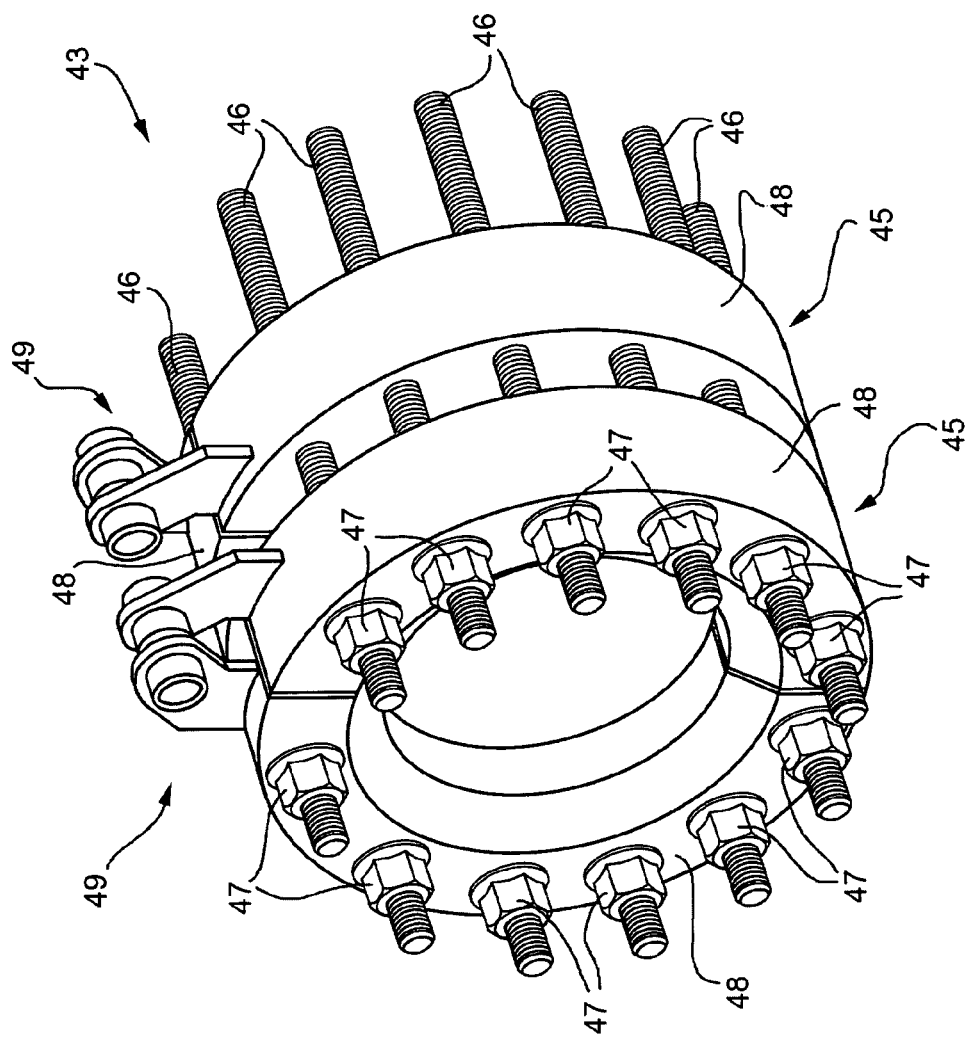
FIG. 14 shows a larger-scale view in perspective, with parts removed for clarity, of a detail of a self-centring connecting assembly designed to implement the method of joining two portions of an underwater pipeline according to the present invention.

With reference to FIG. 14, clamping device 43 comprises two annular jaws 45 connectable to each other by threaded bars 46 and nuts 47; and each annular jaw 45 comprises two half-rings 48 connected by a hinge 49, so jaw 45 can be opened and placed about one of pipeline portions 31, 32.

Figure 13:
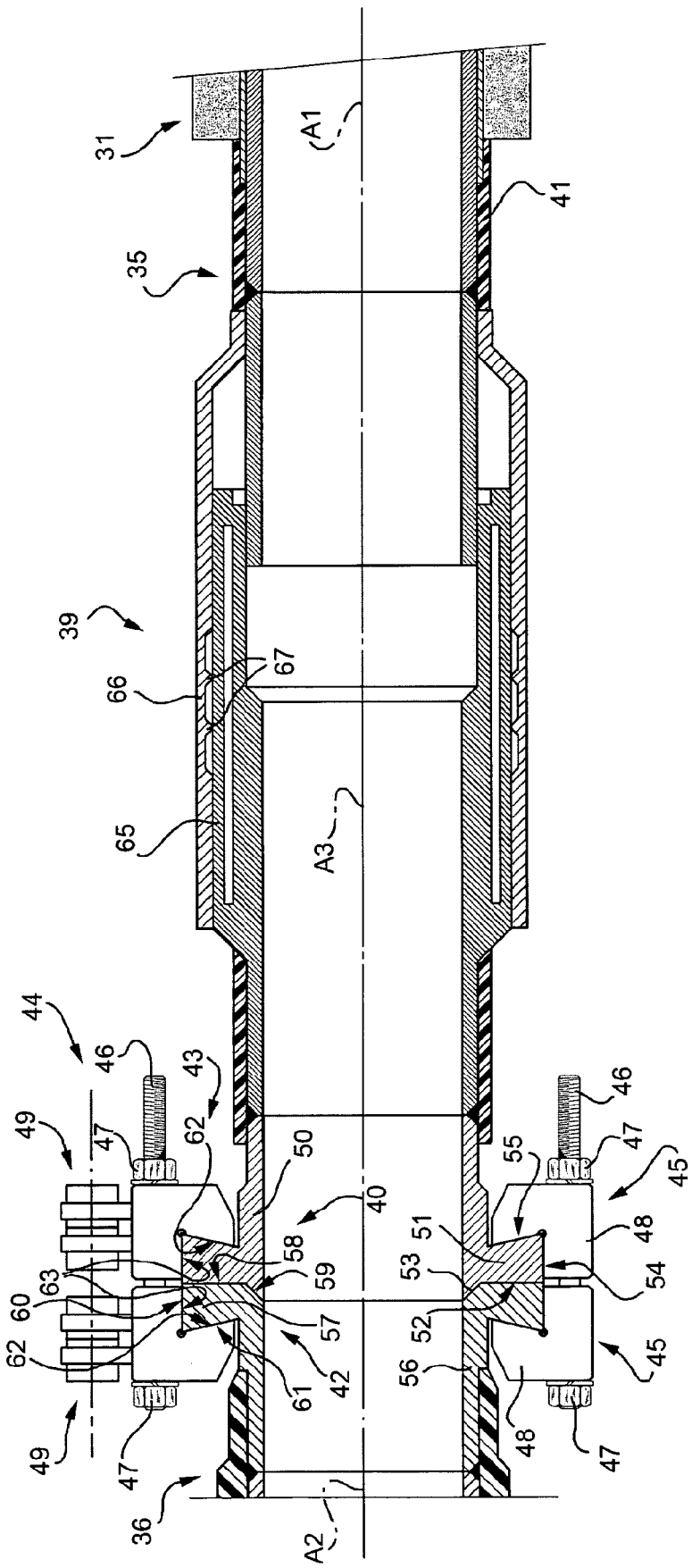
FIG. 13 shows a larger-scale, longitudinal section, with parts removed for clarity, of a telescopic sleeve welded to a pipeline portion and assembled to another pipeline portion in accordance with the method of joining two portions of an underwater pipeline according to the present invention.

With reference to FIG. 13, coupling head 40 comprises a tubular portion 50 joined to telescopic sleeve 39; a flange 51 with a front face 52 perpendicular to axis A3 and facing coupling head 42; a truncated-cone-shaped projection 53 extending about axis A3; a lateral face 54; and a rear face 55 sloping with respect to axis A3.

Likewise, coupling head 42 comprises a tubular portion 56 welded to pipeline portion 32; a flange 57 with a front face 58 perpendicular to axis A2 and facing coupling head 40; a truncated-cone-shaped recess 59 extending about axis A2 and complementary in shape and size to projection 53; a lateral face 60; and a rear face 61 sloping with respect to axis A2.

Each jaw 45 has a seat defined by two faces 62 and 63 designed to mate respectively with rear face 55 and lateral face 54, or with rear face 61 and lateral face 60. In other words, each jaw 45 has a seat designed to form a joint with flange 51 or flange 57.

When the two jaws 45 are tightened one against the other, telescopic sleeve 39 is extended, and projection fits inside recess 59 to accurately align coupling heads 40 and 42 until front faces 52 and 58 come into contact with each other.

Figure 12:
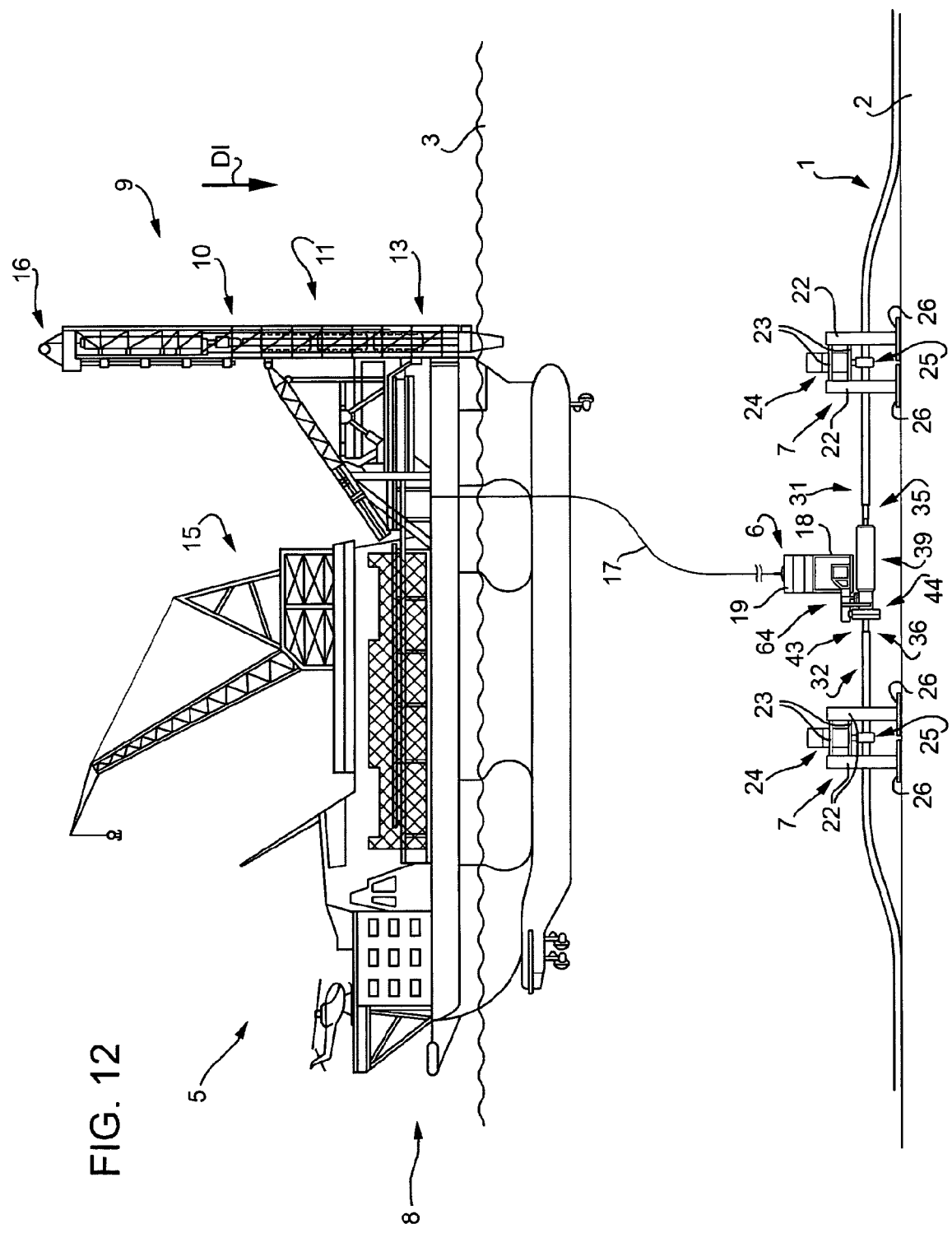

With reference to FIG. 12, jaws 45 are positioned about respective coupling heads 40, 42 and clamped by means of a dedicated clamping unit 64 controlled by underwater vehicle 6.

With reference to FIG. 13, telescopic sleeve 39 is locked into position by deforming one wall by means of a known hydroforming process, which deforms an inner tube 65 against an outer tube 66 with annular ribs 67.

The method according to the present invention is extremely straightforward and requires no bulky equipment.

Method of Laying an Underwater Pipeline

Figure 15:
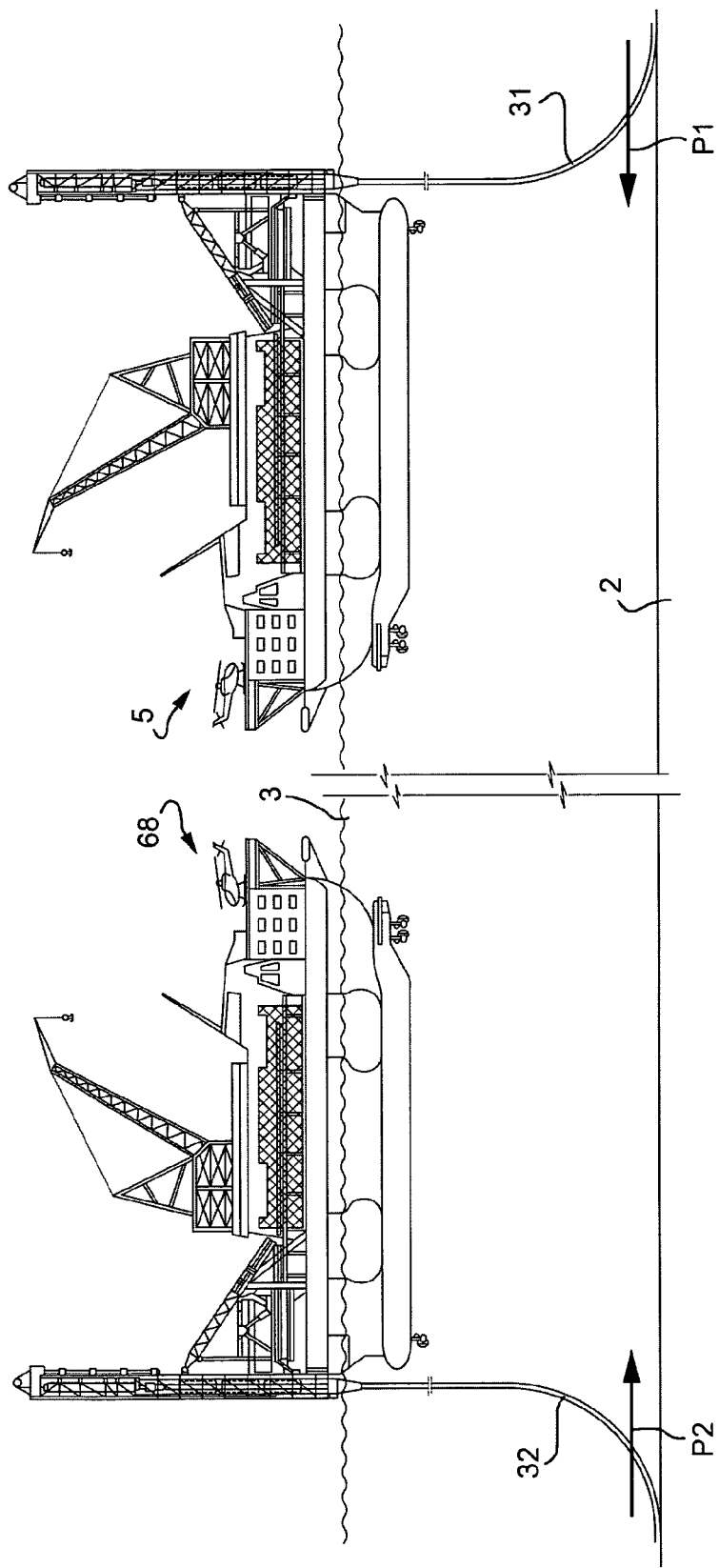
FIG. 15 shows a side view, with parts removed for clarity, of one stage in the method of laying an underwater pipeline according to the present invention.

The method described of joining two underwater pipeline portions may be used to advantage for repairing pipelines, particularly in deep water. The pipeline joining method forming part of the repair method described above, however, may also be employed as part of a method of laying an underwater pipeline 1 as shown in FIG. 15, in which two laying vessels 5 and 68 lay two underwater pipeline portions 31 and 32 extending along respective converging paths P1 and P2 and fitted respectively with a telescopic sleeve equipped with a coupling head, and with a coupling head. The two coupling heads are of the type described above, and are connectable in deep water in accordance with the method of joining two pipeline portions.

This application of the method of joining two underwater pipeline portions provides for simultaneously laying two underwater pipeline portions, each possibly hundreds of kilometers in length, and so greatly reducing overall laying time.

First Variation of the Method

Figure 16:
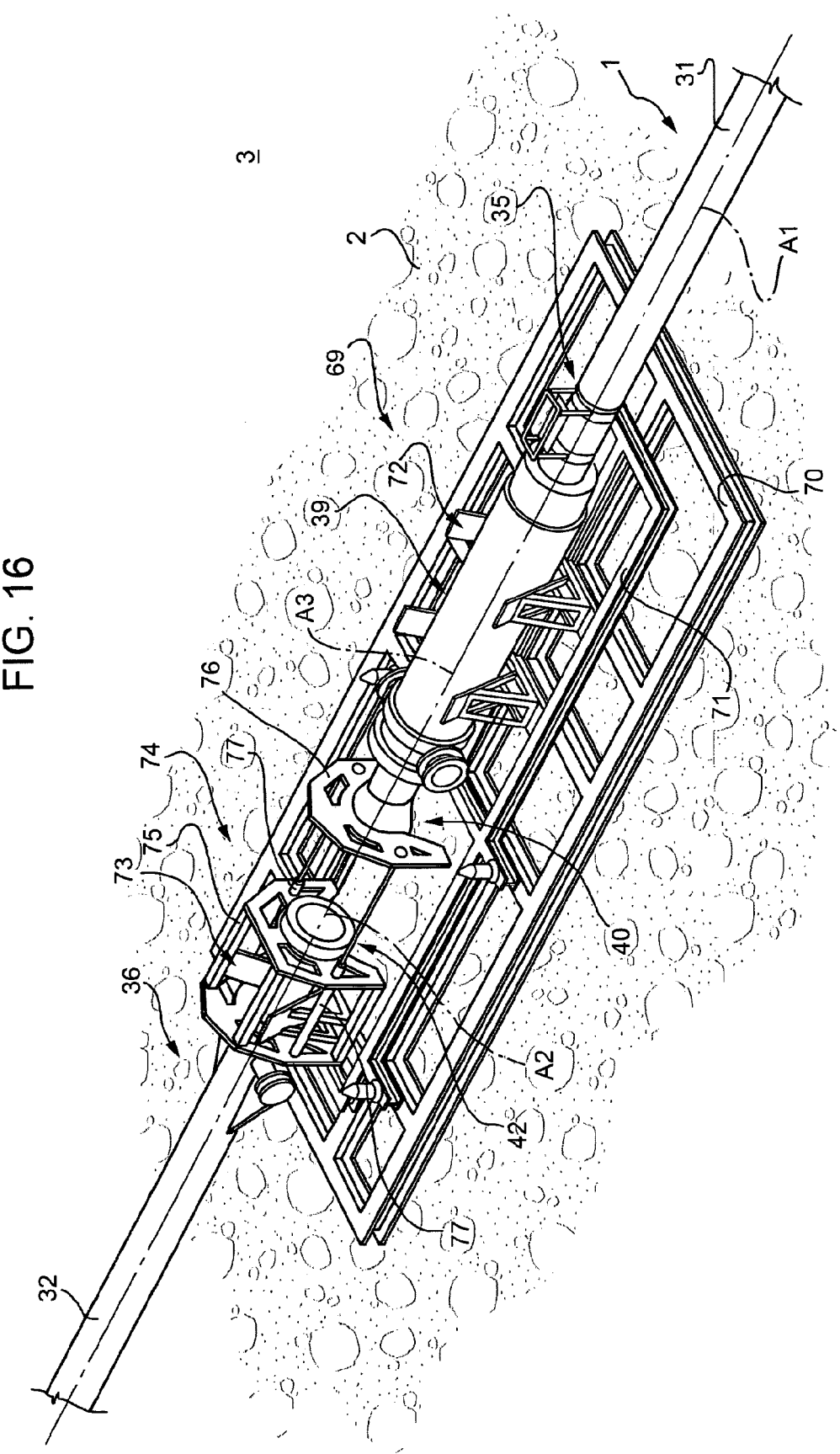
FIG. 16 shows a view in perspective, with parts removed for clarity, of one stage in a first variation of the method according to the present invention.

A first variation, shown roughly in FIG. 16, employs a device 69 designed to rest on bed 2 of body of water 3 to support ends 35 and 36 of pipeline portions 31 and 32 and sleeve 39 in respective given positions.

The steps in the method described above remain the same, except that coupling heads 40, 42 and sleeve 39 are laid on device 69, which serves to guide coupling heads 40, 42 accurately into respective given positions in which coupling heads 40, 42, i.e. axes A2 and A3, are substantially aligned. Once substantially aligned, coupling heads 40 and 42 are first moved into contact with each other, thus completing the alignment, and then clamped as described above.

Once coupling heads 40 and 42 are connected hermetically, pipeline 1 can be raised, and device 69 removed and raised on board laying vessel 5 (not shown in FIG. 16).

In the FIG. 16 example, device 69 comprises a base 70 defining a supporting base on bed 2; and a cradle 71 fitted to base 70 and comprising a flared seat 72 designed to guide telescopic sleeve 39 into a given position, and a flared seat 73 designed to guide coupling head 42 into a given position. Device 69 is designed to operate with an actuating device 74 for moving coupling heads 40 and 42 towards each other.

Base 70 is substantially flat, and cradle 71 is connected to base 70 by elastic joints (not shown in FIG. 16) allowing adjustment of cradle 71 with respect to base 70, in particular in a direction crosswise to pipeline 1. Alternatively, cradle 71 is connected to base 70 on slides running along guides (not shown).

Actuating device 74 comprises a yoke 75 for engaging coupling head 42; a yoke 76 for engaging coupling head 40; and preferably hydraulic actuators 77 connecting yokes 75 and 76 and controlled to selectively bring coupling heads 40 and 42 into contact with each other. From this point on, the coupling heads are joined as described in the preceding method.

This first variation of the method has the advantage of automatically aligning the coupling heads by means of the seats in the cradle. The coupling heads and respective pipeline portions are lowered into the cradle using systems similar to those employed to lower and recover the pipeline, and with the aid of underwater vehicles 6 (not shown) to roughly centre the seats in the cradle. The first variation of the method also speeds up connection by eliminating the need to align the coupling heads, and by involving only one connection below water.

Second Variation of the Method

Figure 17:
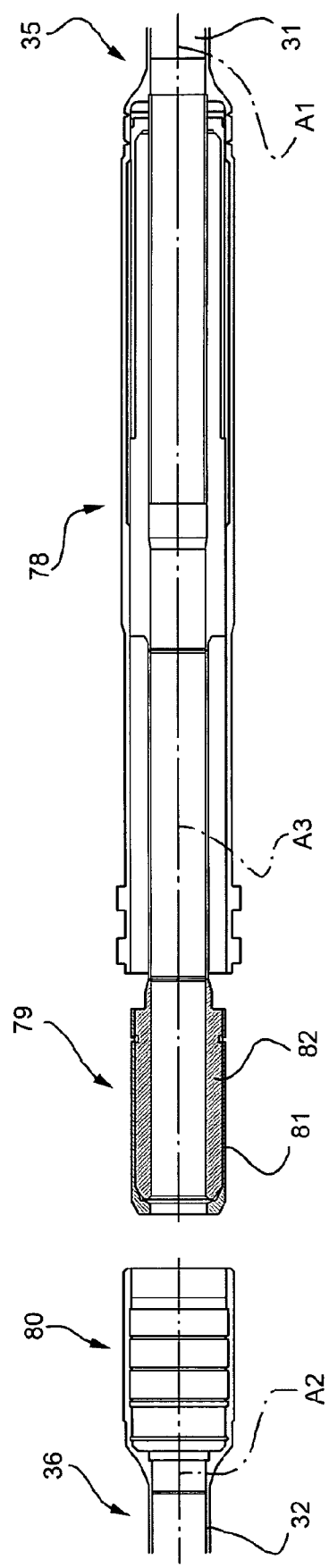
FIG. 17 shows a longitudinal section of two pipeline portions fixed to a sleeve equipped with a coupling head, and to a coupling head respectively.

In a second variation of the method, a telescopic sleeve 78 and coupling heads 79 and 80 are preferably substituted for telescopic sleeve 39 and coupling heads and 42, as shown in FIG. 17. More specifically, telescopic sleeve 78 and coupling head 80 have substantially the same outside diameter, and coupling heads 79 and 80 have no flanges. Telescopic sleeve 78 is locked using the same system as for telescopic sleeve 39, and coupling heads 79 and 80 are joined by inserting coupling head 79 inside coupling head 80 and deforming coupling head 79. More specifically, coupling head 79 has a thin outer wall 81 and a thick inner wall 82 separated by a gap into which pressurized fluid is fed to deform the outer wall against coupling head 80 and so join coupling heads 79 and 80 hermetically.

Figure 18:
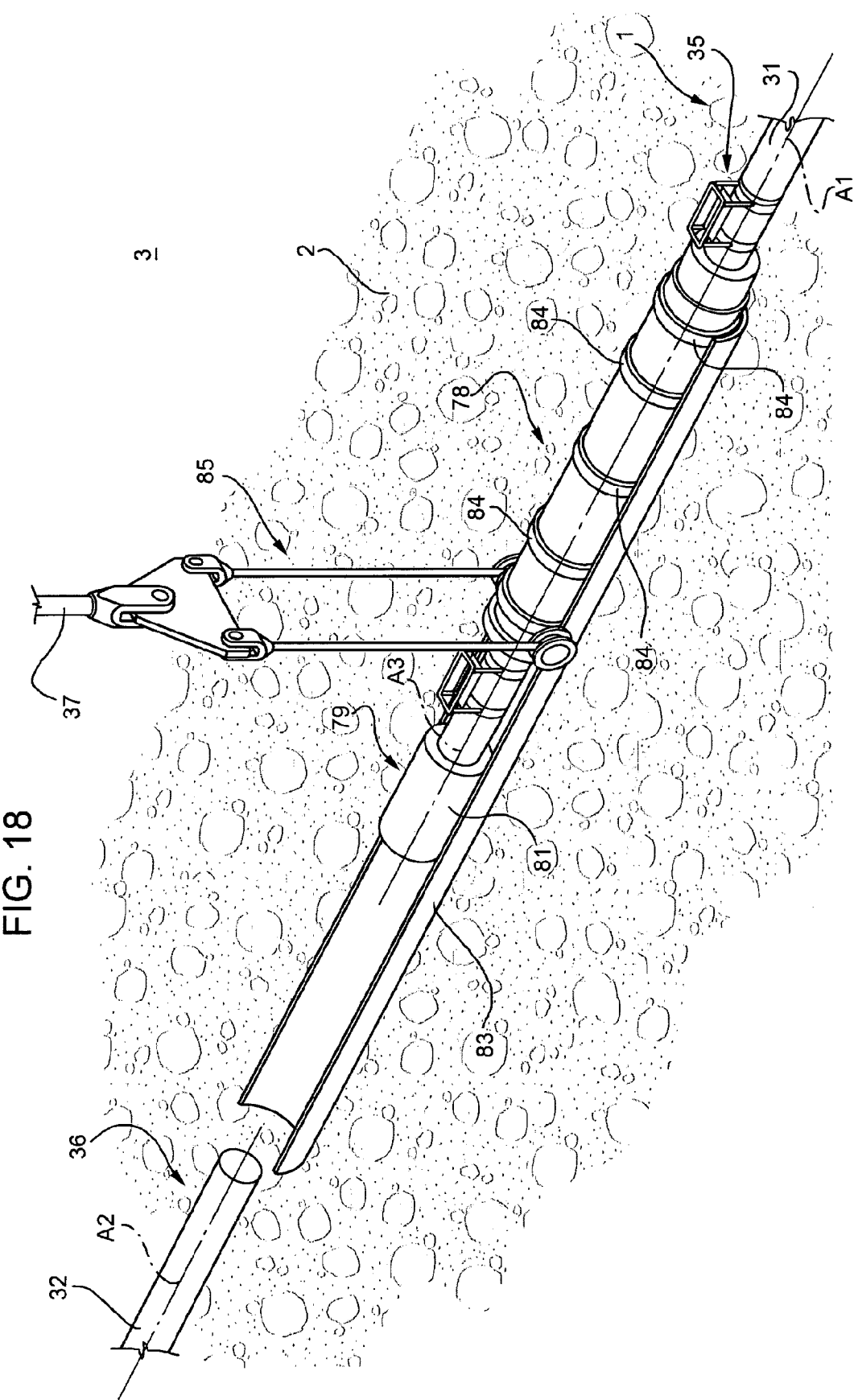
FIGS. 18, 19 and 20 show views in perspective, with parts removed for clarity, of successive stages in a further variation of the method according to the present invention.

This second variation of the method comprises substantially the same steps as the first variation, except that telescopic sleeve 78 is fitted to a cradle 83 above body of water 3; and cradle 83, together with telescopic sleeve 78 and coupling head 79, is laid on bed 2 of body of water 3, as shown in FIG. 18.

With reference to FIG. 18, cradle 83 is substantially defined by a cylindrical half-shell, which is bound or otherwise fixed to telescopic sleeve 78 using means not shown in the drawings, and has a free portion projecting beyond coupling head 79.

In the event the diameter of telescopic sleeve 78 is not constant along its whole length, spacers 84 are inserted between cradle 83 and telescopic sleeve 78, so that the respective longitudinal axes of telescopic sleeve 78, coupling head 79, and the cradle are substantially aligned. Cradle 83 is attached accurately above body of water 3, on board laying vessel 5; and cradle 83, telescopic sleeve 78, coupling head 79, and pipeline portion 31 are then laid on bed 2 of body of water 3 using a pipeline lowering and recovery system, of which FIG. 18 shows a cable 37, and a harness 85 connected to cable 37 and telescopic sleeve 78.

Figure 19:
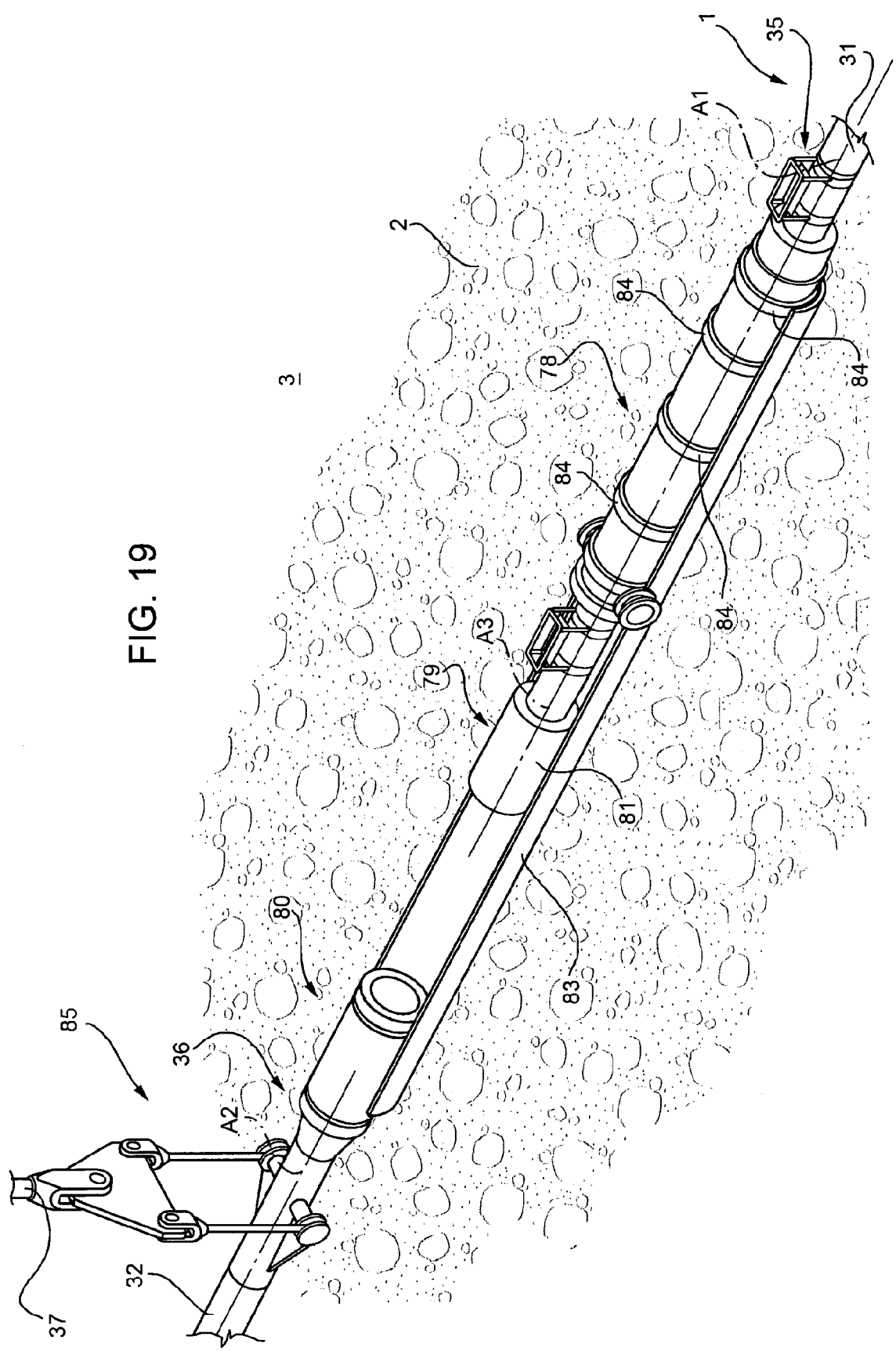

Portion 32 of pipeline 1 is then raised above body of water 3; coupling head 80 is joined to end 36; and coupling head 80 and pipeline portion 32 are then lowered into body of water 3 and into cradle 83, as shown in FIG. 19.

Coupling head 80 is seated inside cradle 83, facing coupling head 79. At this point, coupling head 79 is inserted inside coupling head 80 by the actuating device described with reference to FIG. 16; and an underwater vehicle 6 (not shown in FIG. 19) then injects pressurized fluid to join coupling heads 79 and 80.

Figure 20:
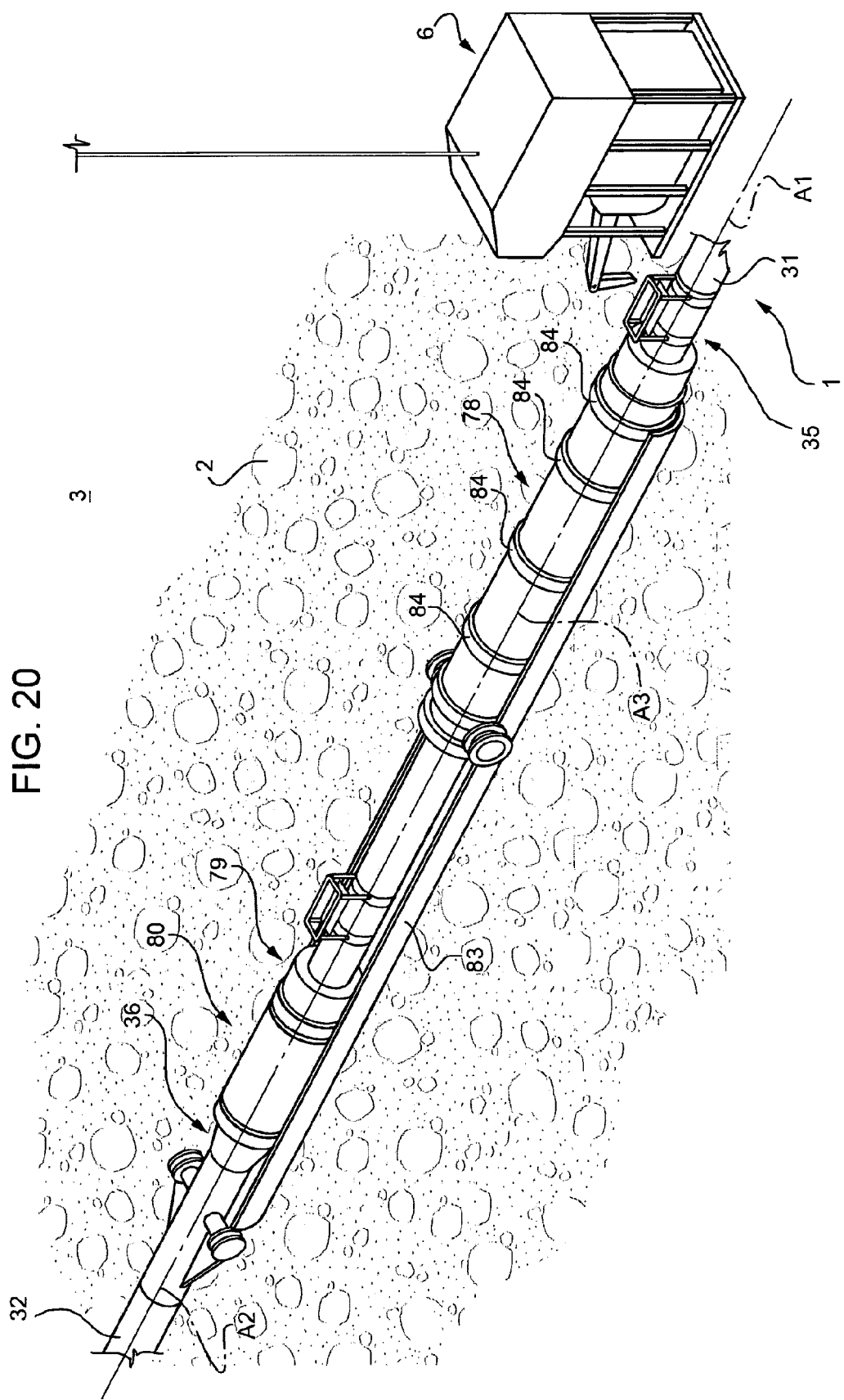

With reference to FIG. 20, underwater vehicle 6 injects pressurized fluid into the gap in telescopic sleeve 78 to lock telescopic sleeve 78 in a given position.

This second variation of the method provides for easy, low-cost alignment of the coupling heads, and also has additional advantages over the first variation: the thinness of the cradle imposes no sharp bends in the pipeline close to the cradle; the cradle can be left on the bed and connected to the pipeline to act as a stiffener at the joint between the two pipeline portions; and the cradle is extremely simple to make and handle.

In another variation, not shown, the cradle may be connected to the coupling head without the telescopic sleeve, and the telescopic sleeve may be laid on the cradle together with the other coupling head.

The variations of the method described obviously also apply to both repairing damaged pipelines, and joining independently laid underwater pipeline portions.

Though the above description refers specifically to a laying vessel equipped with a J-launch tower, the methods according to the present invention also apply to vessels equipped with substantially horizontal assembly lines and S-launch ramps.

Clearly, changes may be made to the embodiments described of the present invention without, however, departing from the scope of the accompanying Claims.

The invention claimed is:

1. A method of joining two portions of an underwater pipeline for conducting fluid and/or gas on the bed of a body of water; the method comprising the steps of:
    positioning a cradle on the bed of the body of water;
    joining a telescopic sleeve, having a first coupling head, to a first end of a first pipeline portion above the body of water;
    lowering the first end, the telescopic sleeve, and the first coupling head in the body of water;
    lowering, after positioning the cradle on the bed of the body of water, the first end, the telescopic sleeve, and the first coupling head onto the cradle to guide the first coupling head into a first given position;
    joining a second coupling head to a second end of a second pipeline portion above the body of water;
    lowering the second end and the second coupling head in the body of water;
    lowering the second end and the second coupling head onto the cradle to guide the second coupling head into a second given position close to the first coupling head; and
    connecting the first and second coupling heads hermetically in the body of water and on the cradle.

2. The method as claimed in claim 1, wherein the step of connecting the first and second coupling heads hermetically comprises moving the first and second coupling heads towards each other by means of an actuating device comprising a first yoke for engaging the first coupling head, a second yoke for engaging the second coupling head, and actuators connecting the first and second yokes.

3. The method as claimed in claim 1, wherein the step of connecting the first and second coupling heads hermetically comprises inserting the first coupling head inside the second coupling head; and expanding the first coupling head against the second coupling head.

4. The method as claimed in claim 1, further comprising the step of locking the telescopic sleeve in the body of water, after connecting the first and second coupling, heads hermetically in the body of water.

5. The method as claimed in claim 3, wherein the step of expanding the first coupling head against the second coupling head comprises hydroforming.

6. The method as claimed in claim 4, wherein the step of locking the telescopic sleeve comprises hydroforming.

7. A method of repairing an underwater pipeline, the method comprising the steps of cutting and removing a pipeline section from the pipeline in a body of water to form first and second pipeline portions; raising the first and second pipeline portions partly above the body of water; and joining the first and second pipeline portions using the method of joining two portions of an underwater pipeline as claimed in claim 1.

8. A method of laying an underwater pipeline, the method comprising the steps of:
    laying first and second pipeline portions along two respective converging paths by means of two respective laying vessels; and
    joining the first and second pipeline portions using the method of joining two portions of an underwater pipeline as claimed in claim 1.

9. A method of joining two portions of an underwater pipeline for conducting fluid and/or gas on the bed of a body of water, the method comprising the steps of:
    joining a telescopic sleeve, having a first coupling head, to a first end of a first pipeline portion above the body of water;

joining a cradle to the first end of the first pipeline portion above the body of water;

lowering the first end, the telescopic sleeve, the first coupling head, and the cradle into the body of water;

lowering the first end, the telescopic sleeve, the first coupling head, and the cradle onto the bed of the body of water in a first given position;

joining a second coupling head to a second end of a second pipeline portion above the body of water;

lowering the second end and the second coupling head in the body of water;

lowering, after lowering the first end, the telescopic sleeve, the first coupling head, and the cradle onto the bed of the body of water in the first given position, the second end and the second coupling head onto the cradle to guide the second coupling head into a second given position close to the first coupling head; and connecting the first and second coupling heads hermetically in the body of water and on the cradle.

10. The method as claimed in claim 9, further comprising the step of aligning the longitudinal axis of the cradle and the axis of the telescopic sleeve above the body of water.

11. The method as claimed in claim 9, wherein the cradle is defined by a tubular half-shell.

12. The method as claimed in claim 9, wherein the cradle is permanently attached to the first end of the first pipeline portion above the body of water to act as a stiffener for the connection between the first and second coupling heads.

13. The method as claimed in claim 9, wherein the step of connecting the first and second coupling heads hermetically comprises inserting the first coupling head inside the second coupling head; and expanding the first coupling head against the second coupling head.

14. The method as claimed in claim 13, wherein the step of expanding the first coupling head against the second coupling head comprises hydroforming.

15. The method as claimed in claim 9, further comprising the step of locking the telescopic sleeve in the body of water, after connecting the first and second coupling heads hermetically in the body of water.

16. The method as claimed in claim 15, wherein the step of locking the telescopic sleeve comprises hydroforming.

17. A method of repairing an underwater pipeline, the method comprising the steps of cutting and removing a pipeline section from the pipeline in a body of water to form a first and second pipeline portions; raising the first and second pipeline portions partly above the body of water; and joining the first and second pipeline portions using the method of joining two portions of an underwater pipeline as claimed in claim 9.

18. A method of laying an underwater pipeline, the method comprising the steps of:

laying first and second pipeline portions along two respective converging paths by means of two respective laying vessels; and joining the first and second pipeline portion using the method of joining two portions of an underwater pipeline as claimed in claim 9.

* * * * *